United States Patent [19]

Best et al.

[11] Patent Number: 4,695,190
[45] Date of Patent: Sep. 22, 1987

[54] PRESSURE-BALANCED STAB CONNECTION

[75] Inventors: Michael J. A. Best, Dursley; Richard H. Jones, Stroud, both of England; Joseph H. Hynes, Houston, Tex.; Richard J. Pond, Nailsworth; Colin R. Gordon, Stroud, both of England

[73] Assignee: Smith International, Inc., Newport Beach, Calif.

[21] Appl. No.: 836,009

[22] Filed: Mar. 4, 1986

[51] Int. Cl.$^4$ ...................... E21B 33/038; E21B 34/04
[52] U.S. Cl. ...................................... 405/169; 405/170
[58] Field of Search ................ 405/169, 170; 166/341, 166/344, 347, 360; 285/93, 108, 110, 348, 900

[56] References Cited

U.S. PATENT DOCUMENTS

| | | | |
|---|---|---|---|
| 2,017,717 | 10/1935 | Heeter | 285/348 |
| 2,318,575 | 5/1943 | Armington et al. | 285/348 |
| 2,918,972 | 12/1959 | Tubbs | 166/88 |
| 3,248,130 | 4/1966 | Knight | 285/27 |
| 3,545,539 | 12/1970 | Manning | 405/169 |
| 3,746,372 | 7/1973 | Hynes et al. | 285/95 |
| 4,109,712 | 8/1978 | Regan | 166/332 |
| 4,191,256 | 3/1980 | Gray et al. | 166/344 |
| 4,402,773 | 9/1983 | Morrill | 285/348 |
| 4,440,423 | 4/1984 | Pfeifler | 285/25 |
| 4,602,806 | 7/1986 | Suliger | 285/108 |
| 4,607,701 | 8/1986 | Gundersen | 166/344 |

OTHER PUBLICATIONS 1968-69, Composite Catalog of Oil Field Equipment and Services, vol. 3, pp. 3984-3985.
1982-83 Composite Catalog of Oil Field Equipment and Services, vol. 5, pp. 8516-8517.

Primary Examiner—Richard J. Scanlan, Jr.
Assistant Examiner—Anthony Knight
Attorney, Agent, or Firm—William E. Shull; Paul F. Simpson

[57] ABSTRACT

Apparatus for connecting portions of subsea flow conduits includes a stab member with a body and having a bore therethrough, one end of which exits from the stab body through a side port. A stab receptacle includes a bore for receiving the stab body, and a flow bore intersecting the receiving bore and leading to the exterior of the receptacle. The side port communciates with the receptacle flow bore when the stab member is landed in the receiving bore. Seals above and below the side port seal the receiving bore above and below the intersection of the receptacle flow bore and receiving bore. The cross-sectional areas of the seals exposed to internal fluid pressure are substantially equal, resulting in zero blow-apart force on the stab connection. Alternatively, the lower seal can have a larger exposed cross-sectional area than the upper seal, resulting in a net force tending to hold the connection teogether. Split retainer rings having external chamfer surfaces are mounted on the stab body above and below the lower seals. The retainer rings are disposed in grooves allowing the rings limited sliding radial movement with respect to the stab body. The stab receptacle is mounted to a support frame with relatively long, thin, vertically disposed studs which resist vertically directed forces but permit lateral and rotational deflection of the stab receptacle when acted upon by non-vertical forces. The stab body bore and receptacle flow bore include shaped portions to reduce turbulence of fluids flowing therethrough.

25 Claims, 10 Drawing Figures

PRESSURE-BALANCED STAB CONNECTION

BACKGROUND OF THE INVENTION

The present invention relates generally to the field of equipment for producing oil and gas, and more particularly to connections for joining conduits conducting the flow of oil and gas. Still more particularly, it relates to connections between subsea wellheads and subsea flowlines.

Finding and producing oil and gas continually becomes ever more complicated and expensive. New reserves of petroleum are harder to find and more difficult to produce with each passing year. The increasing scarcity of oil and gas long ago compelled the oil industry to move its search for hydrocarbons off dry land, to explore in offshore locations. The history of offshore exploration is marked by milestones of ever-increasing depth records for drilling and producing petroleum deposits. Inevitably, technology quite suitable for one set of conditions eventually becomes outmoded and inadequate when applied in deeper and harsher marine environments. The need for petroleum, however, continually pushes the limits of technology for providing safe, economical, controllable operations under more demanding conditions. Technology thus evolves to cope with these new demands.

One area witnessing major strides and steady advancement in capability is the technology of sea floor-based petroleum production. Wellheads can be placed upon the sea floor to control and direct the flow of oil and gas to remote processing facilities. Christmas trees, manifolds, and associated piping can be located at the subsea wellhead for direct regulation of the production process. Subsea Christmas trees often allow for remote control and manipulation of valves, chokes, regulators, etc., from a distant facility. Such isolated subsea wellheads thus allow for producing oil and gas reserves that otherwise would be uneconomical to recover because of environmental conditions, location and dispersion of reserves, and quantity of reserves recoverable. Subsea wellhead and production equipment, therefore, ultimately provide means for producing more of the earth's valuable petroleum deposits.

While known apparatus and methods for subsea production have solved numerous prior problems, significant operational obstacles still exist. In relatively shallow, calm waters, diving personnel can effectively and economically perform a multitude of underwater tasks necessary to initiate and maintain subsea production. In deeper-water locations, however, physiological limitations impose numerous restraints on the feasible use of diver assistance. Extended diving in deeper waters involves more complex equipment, such as diving bells, diving suits, or saturation chambers, to enhance the abilities and lengthen the allowable time of divers working at extreme depths. Ultimately, it becomes more cost-effective to design for installing and operating subsea equipment without need for diver assistance. It has become commonplace to connect subsea trees and flowlines remotely, without direct "hands-on" human intervention. New problems arise, however, using such diverless equipment. One common problem is the difficulty in achieving precise alignment and accurate construction of separate and discrete elements deep within the ocean. Conditions several thousand feet or more below the surface differ drastically from those within regulated, controlled onshore fabrication and assembly locations. Slight misalignments of independently-machined parts can be overly costly to a subsea project, since they can result in the need for complex and time-consuming emergency repairs or other remedial action, both above and below the surface of the sea. One solution to the misalignment problem is to maintain manufacturing tolerances to extremely narrow limits, and to account in the design for all conditions expected to be experienced in the final stages of subsea construction. Such tight tolerances and all-encompassing, complex design, however, are inordinately expensive and difficult to carry out in practice. Expensive design and fabrication of equipment can drive up costs enough to defeat the economic justification for a subsea petroleum production project.

What were relatively simple tasks to accomplish in less-demanding locations, moreover, can become difficult or nearly impossible in more severe environments. Onshore, for example, joining two fluid-carrying pipes together and sealing the contained internal pressure is easily accomplished with a conventional API sealed flange having studs, nuts, and a ring gasket. The ring gasket seals the connection; the studs and nuts exert the forces needed to hold the connection together. Aligning flanges, inserting a gasket, and threading and tightening studs and nuts can, however, become an exorbitant and impractical task at great subsea depths. The difficulty in connecting flow conduits worsens as water depths and internal fluid pressures increase. API flanges and other conventional connections necessarily require forces to hold them together. The internal pressure tends to push two joined conduits apart at the point of connection. The internal pressure acting on the seal area between the joined conduits creates this so-called "blow-apart" force. Higher internal pressures create greater blow-apart forces. Higher internal pressures thus require larger connections with larger, additional hardware to overcome the greater blow-apart forces. Mating and securing such larger connections without diver assistance therefore becomes increasingly complex at greater subsea depths.

Other problems that are minor or inconsequential in simpler environments become of major concern at great subsea pressures and depths. Wellheads are attached to the tops of vertical strings of well casing which can be hundreds or thousands of feet long extending deep into the earth. Flowlines and production equipment, by contrast, are secured at or near the sea floor, or even float in the water. Differential settling inevitably occurs, causing relative movement between a wellhead and the flowlines attached to it. Onshore, this problem is relatively minor, since the wellhead and Christmas tree are readily observable, and in most cases corrections or repairs can easily be made. For subsea production, however, the problem is much more serious. Differential settling can impose considerable stresses in the flowlines and the Christmas tree when they are joined by a rigid connection, such as a simple flange having very little, if any, "play" in it. As a result, when the flowlines or subsea tree are subjected to even minimal vertical or horizontal movements which occur due to settling, subsea currents, or routine operations, the probability of material or equipment failure increases. Again, the results of such failure are exacerbated and intensified in the subsea environment. Repairs are often difficult and time-consuming. Pollution and degradation of the marine environment also can result from subsea "spills" caused by failures in flow conduit piping or connectors, with the possibility of attendant legal liability of the operator or equipment manufacturer.

Subsea production technology is a vital link in the chain of supply of oil and gas so crucial to the functioning of modern industrial society. Prior art apparatus has provided means for subsea production, but significant problems remain. Existing equipment still confronts the user with the inherent disadvantages of having to achieve safe, controllable, precise subsea connections with relatively uneconomical or impractical prior art methods and apparatus. The need therefore exists for subsea flow conduit connections which are simple, yet reliable. Such connections need also to allow for relative movement of attached components, thereby reducing the operating hazards and the risks of failure of subsea flow connections.

SUMMARY OF THE INVENTION

The present invention provides apparatus for effecting connections between portions of subsea flow conduits which overcome the problems generally described above with prior art methods and apparatus. The present invention results in a simple, economical, yet uniformly safe and reliable connection that is relatively easy to install and, once installed, is relatively trouble-free and easy to maintain. The subsea connections of the present invention are quickly and easily made and, once made, allow for relative movement of attached components which reduces the risk of flow conduit failure which could otherwise result from rigid connections such as those of the prior art.

According to the invention, a stab member including a stab body is mounted, for example, on a Christmas tree. The stab body includes a stab body bore therethrough, one end of which exits the stab body and is in fluid communication with, for example, the flow bore of the Christmas tree. The other end of the stab body bore exits from the stab body through a side port. A stab receptacle is mounted, for example, on a wellhead and includes a stab receiving bore for receiving the stab body therewithin when the Christmas tree is landed on the wellhead. The stab receptacle includes a flow bore having one end intersecting the stab receiving bore and its other end exiting from the stab receptacle for communicating with, for example, a flowline. The side port of the stab body bore communicates with the flow bore of the stab receptacle when the stab member is landed in the stab receiving bore. The stab member includes means for orienting it with respect to the Christmas tree to ensure communication of the side port with the receptacle flow bore.

Upper and lower seals are provided above and below the side port of the stab body bore, respectively, for sealing against the walls of the stab receiving bore above and below the intersection of the stab receptacle flow bore with the stab receiving bore. According to one embodiment of the invention, the cross-sectional areas of the upper and lower seals which are exposed to pressure from fluids within the stab body bore, stab receiving bore, and stab receptacle flow bore are substantially equal, thus resulting in substantially zero blow-apart force on the stab connection from such pressure. According to an alternative embodiment of the invention, the cross-sectional area of the lower seal which is exposed to such pressure is greater than the cross-sectional area of the upper seal exposed to the same pressure, thus resulting in a net force on the stab connection tending to hold it together, i.e., to resist withdrawal of the stab member from the stab receiving bore.

Split retainer rings having external chamfer surfaces are mounted on the stab body above and below the lower seals. The retainer rings are disposed in grooves allowing limited sliding movement of the retainer rings in a direction transverse to the longitudinal axis of the stab body. The upper and lower seals can each include, for example, a pair of elastomeric lip seal rings.

The stab receptacle is mounted on the wellhead with relatively long, thin, vertically disposed studs attached at their upper ends to brackets mounted on the stab receptacle near its upper end, and at their lower ends to the wellhead. The studs rigidly resist forces acting on the stab receptacle from a vertical direction, yet permit limited lateral and rotational deflection of the stab receptacle with respect to the wellhead when forces act on the stab receptacle from a direction other than vertical.

The stab body bore and stab receptacle flow bore each include specially shaped portions that both reduce turbulence and preclude flow across sharp corners when fluids flow in either direction, from one bore to the other.

These and various other objects and advantages of the present invention will become readily apparent to those skilled in the art upon reading the following detailed description and claims and by referring to the accompanying drawings.

BRIEF DESCRIPTION OF THE DRAWINGS

For a detailed description of the preferred embodiment of the present invention, reference will now be made to the accompanying drawings wherein.

DESCRIPTION OF THE PREFERRED EMBODIMENT

Figure 1:
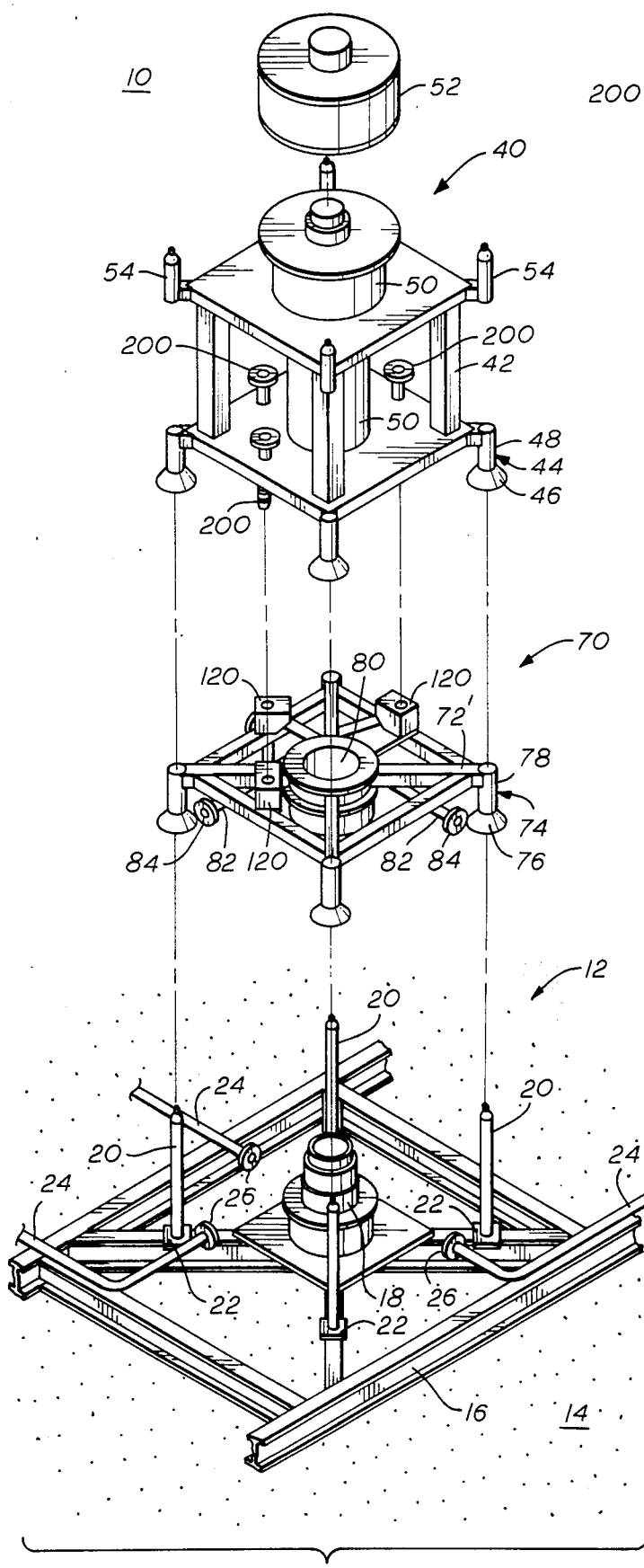
FIG. 1 illustrates an exploded view of a subsea wellhead system employing the invention.

Referring initially to FIG. 1, there is shown therein a subsea wellhead system 10, built according to the principles of the present invention, for remote production of hydrocarbon deposits from subsurface petroleum reservoirs. The subsea wellhead system 10 includes a wellbay template 12 surrounding a wellhead 18 at the sea floor 14. A flowline connection module 70 ("FCM") attaches to the wellbay template 12 and mates with the wellhead 18. A tree module 40 containing a Christmas tree 50 topped with a tree cap 52 attaches to the wellhead 18 and aligns with the wellbay template 12 and the FCM 70. The tree module 40 includes stab members 200, attached to the Christmas tree 50, that are sealingly received into stab receptacles 120 mounted on the FCM 70 and flow-connected to FCM flowlines 82 attached to the FCM 70. The stab members 200 thereby effect a flow connection and pressure seal between the Christmas tree 50 and the FCM flowlines 82.

Still with reference to FIG. 1, the wellbay template 12 is placed on the sea floor 14 before or during drilling operations by a floating drilling vessel (not shown) working from the sea surface. The wellbay template 12 includes a template frame 16 located around the wellhead 18 and supporting equipment needed to drill and produce from the well extending below the wellhead 18. Other wells may be drilled through and located by additional wellbay templates (not shown) connected to the template frame 16.

The template frame 16 supports several template guide posts 20. Each template guide post 20 connects to the template frame 16 by a template guide post base 22. Template flowlines 24 are installed with the wellbay template 12 to facilitate petroleum production after drilling is complete. Each template flowline 24 has a template flowline flange 26 for connecting to the FCM 70. The entire wellbay template 12 and associated template flowlines 24 are pre-assembled before lowering to the sea floor 14. The template flowlines 24 eventually connect to subsea pipelines (not shown) leading to a remote location for receiving and processing the produced hydrocarbons.

Figure 2:
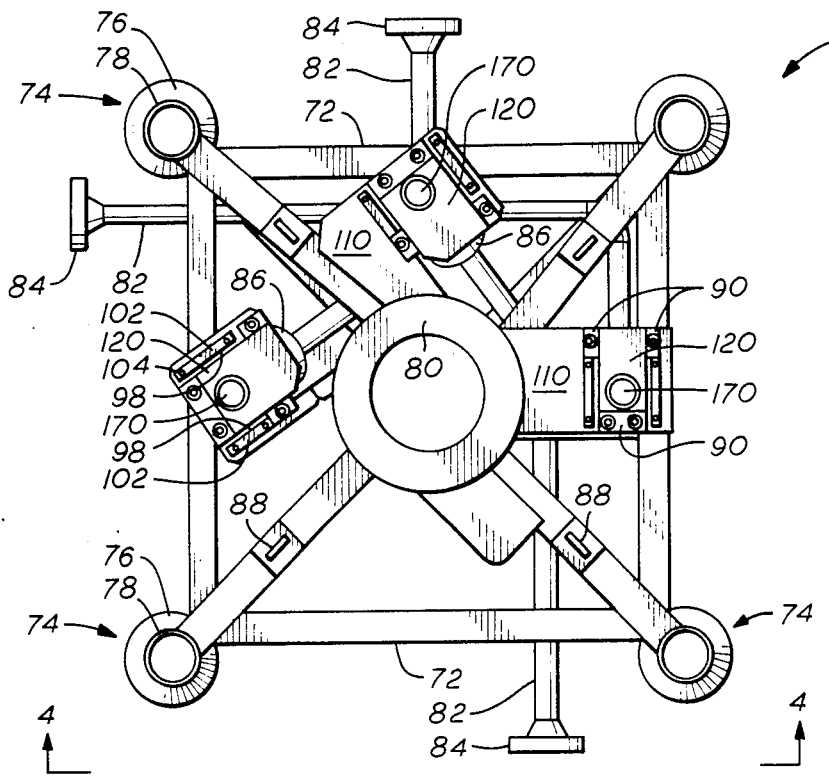
FIG. 2 illustrates a plan view of a flowline connection module similar to that included in the subsea wellhead system depicted in FIG. 1.

With further reference to FIG. 1 and also to FIG. 2, the FCM includes an FCM frame 72 for supporting related equipment, including a wellhead guide 80, and FCM flowlines 82, each FCM flowline 82 terminating at one end with an FCM flowline flange 84. To aid in positioning the FCM 70 on the wellbay template 12, the FCM 70 includes stab guides 74 that can align concentrically with appropriate template guide posts 20. Each stab guide 74 includes a guide cone 76 to help initiate the stab-over process. As the FCM 70 is lowered over the template guide posts 20, the guide cylinders 78 in the stab guides 74 force the FCM 70 to be positioned with sufficiently tight tolerance for proper alignment and make-up of the FCM flowline flanges 84 with the appropriate template flowline flanges 26. The wellhead guide 80 is then in position for lowering over the wellhead 18. Each FCM flowline 82 attaches on its other end to a receptacle flange 86 bolted to a stab receptacle 120. The stab receptacles 120 are mounted on the FCM frame 72 as discussed in more detail below. The FCM frame 72 includes lifting lugs 88 to provide means for lowering the FCM 70 onto the wellbay template 12.

After the FCM 70 is in place on the wellbay template 12, the tree module 40 can be lowered and seated. The tree module 40 includes a tree module frame 42 supporting the Christmas tree 50 and other equipment. The Christmas tree 50 is lowered from the surface on a tree running tool (not shown), which also supplies the force necessary to lock the Christmas tree to the wellhead 18. After the tree module 40 with Christmas tree 50 is installed, the tree cap 52 is similarly locked in place using the tree running tool. The tree module frame 42 also supports tree module guide posts 54 to facilitate lowering of other equipment, such as wireline blowout preventer equipment and the tree running tool, onto the tree module 40. Like the stab guides 74 with guide cones 76 and guide cylinders 78 on the FCM 70, each tree module stab guide 44 includes a guide cone 46 and guide cylinder 48. The guide cones 46 help with initial alignment as the tree module 40 is lowered. The guide cylinders 48 provide a closer-tolerance fit as lowering of the tree module 40 is completed.

Referring in more detail to FIG. 2, each stab receptacle 120 has an upper face 122 having a stab receiving bore 170. As can be seen further with reference to FIGS. 3, 4, and 5, each receptacle flange 86 is bolted to a flange face 126 of its respective stab receptacle 120. A ring gasket groove 136 cut into the flange face 126 allows a ring gasket (not shown) to seal between the flange face 126 and the receptacle flange 86. Flange bolts 138 are threaded and tightened inside bolt holes 134 to hold the receptacle flange 86 in a tight, sealing engagement with the flange face 126. Connecting a receptacle flange 86 attached to an FCM flowline 82 to the flange face 126 of a stab receptacle 120, and connecting the FCM flowline flange 84 (on the other end of the FCM flowline 82) to its respective template flowline flange 26, thus results in a sealed, continuous flowway from the flange face 126 to the template flowline 24.

Figure 4:
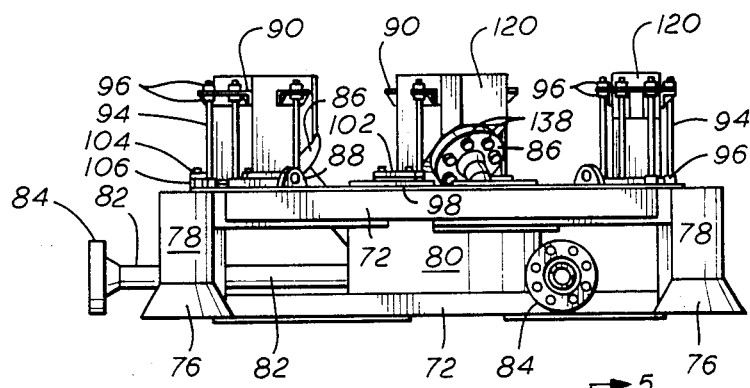
FIG. 4 illustrates a side elevational view of the flowline connection module of FIG. 2, viewed along lines 4—4 of FIG. 2.
Figure 5:
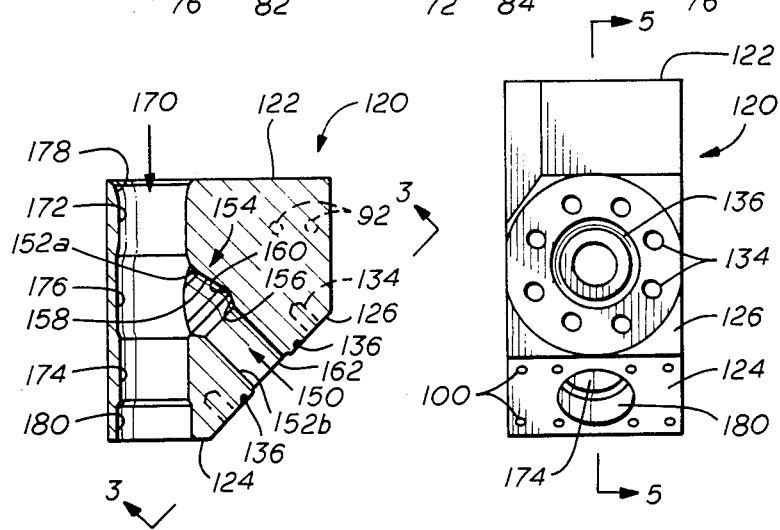
FIG. 5 illustrates a cross-sectional view of the stab receptacle of FIG. 3, viewed along Section 5—5 of FIG. 3.

With reference to FIGS. 2 and 4, each stab receptacle 120 is flexibly mounted to a receptacle support plate 110 secured to the top of the FCM frame 72. Several mounting brackets 90 are attached to each stab receptacle 120 by means of bolts threaded and tightened into bracket bolt holes 92 (FIG. 5). The bracket bolt holes 92 are disposed about the upper region of each stab receptacle 120, penetrating three faces of the stab receptacle 120. Bracket studs 94 extend from each mounting bracket 90 down to the FCM frame 72. Each bracket stud 94 is tightened and secured to the mounting bracket 90 and to the FCM frame 72 by means of bracket stud nuts 96. The bracket studs 94 thus provide axial support holding each stab receptacle 120 in place above the FCM frame 72. Each stab receptacle 120 can deflect in response to an imposed lateral force, since the top of the stab receptacle 120 is pinned by the long bracket studs 94, but the base of the stab receptacle 120 is not rigidly secured.

Figure 3:
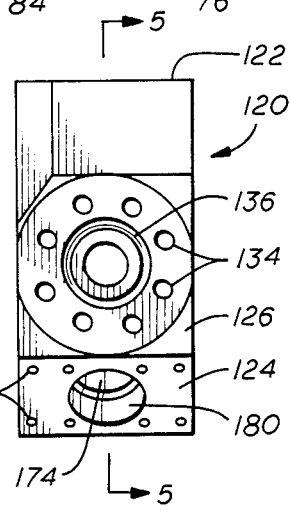
FIG. 3 illustrates an oblique perspective view of a stab receptacle included in the flowline connection module of FIG. 2.

The amount of lateral deflection possible for any stab receptacle to undergo, however, is limited by mounting plates 98 secured to support face 124 on the bottom of each stab receptacle 120. Referring also to FIG. 3, mounting plate bolt holes 100 in the support face 124 allow bolts (not shown) to secure a pair of mounting plates 98 to the support face 124. Each mounting plate 98 projects beyond the support face 124, as shown in FIG. 2. Two retainer plates 102, one each on opposite sides of the support face 124, are attached to the receptacle support plate 110 by retainer plate studs 104 and nuts 106. When assembled, the retainer plate 102 is positioned so there remains a gap between the base of the retainer plate 102 and the top of the receptacle support plate 110 large enough to allow the mounting plates 98 to fit loosely within such space. With each mounting plate 98 thus attached at one end to the stab receptacle 120, and the other end projecting into the gap between the retainer plate 102 and the receptacle support plate 110, the allowable lateral deflection of the bottom of the stab receptacle 120 is restricted within the limits imposed by the retainer plates 102.

Referring now in more detail to FIG. 5, there is shown therein a receptacle flow bore 150 and the stab receiving bore 170 within the body of the stab receptacle 120. One end of the receptacle flow bore 150 intersects the flange face 126 of the stab receptacle 120 with a receptacle flow bore entry 162, and the other end intersects the stab receiving bore 170. The stab receiving bore intersects the upper face 122 with a stab entry bore 178, and intersects the support face 124 with an exit bore 180. The stab receiving bore 170 includes an intermediate bore 176 intersecting the receptacle flow bore 150. Above the intermediate bore 176 is an upper sealing bore 172. Below the intermediate bore 176 is a lower sealing bore 174.

The receptacle flow bore 150 includes straight portions 152a, 152b at either end of the receptacle flow bore 150. Between the straight portions 152a, 152b lies a stepped portion 154. The stepped portion 154 includes a long tapered portion 158 leading from the straight portion 152a intersecting the stab receiving bore 170. At the termination of this long tapered portion 158 is an expanded portion 160 having the largest internal diameter of the receptacle flow bore 150. The expanded portion 160 connects to one end of a short tapered portion 156 having a tapered bore, the short tapered portion 156 connecting at its other end to the straight portion 152b leading to the receptacle flow bore entry 162. Both flow and pressure can be communicated fully between the receptacle flow bore 150 and the stab receiving bore 170.

Figure 6:
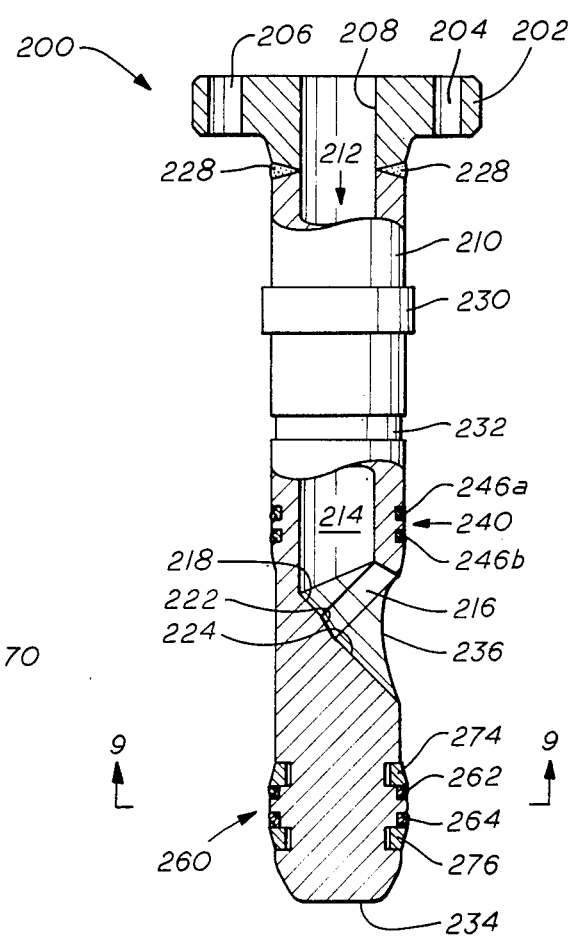
FIG. 6 illustrates a partial cut-away elevational view of a stab member included in a tree module constituting an element of the subsea wellhead system depicted in FIG. 1.

The stab member 200 depicted in FIG. 6 can be matingly inserted into the stab receiving bore 170 of the stab receptacle 120. The stab member 200 includes a stab flange 202 having a flange bore 208, and a stab body 210 having a stab body bore 212, joined by a stab flange weld 228. The stab member 200 is constructed so the flange bore 208 and the stab body bore 212 are concentrically aligned. The stab body bore 212 includes an upper stab bore 214 and a lower stab bore 216. The upper stab bore 214 leads from the flange bore 208 to the lower stab bore 216. The lower stab bore 216 connects to the exterior of the stab body 210 through a stab body side port 236 projecting through the side of the stab body 210. The lower stab bore 216 has a straight portion 218 where the lower stab bore 216 joins the upper stab bore 214. The inner diameter of the straight portion 218 is substantially identical to the inner diameter of the straight portions 152a, 152b of the receptacle flow bore 150. The straight portion 218 connects to a tapered portion 222 having an increasingly enlarged bore proceeding in the direction of a side port 236. The tapered portion 222 joins with an enlarged portion 224 of the lower stab bore 216. The enlarged portion 224 leads to the stab body side port 236. The stab member 200 further has a stab nose 234 on its lower end. The stab nose 234 is slightly rounded, with a flat bottom face, to facilitate insertion into the stab receiving bore 170 of the stab receptacle 120. The stab flange 202 includes flange bolt holes 204 through which bolts or the like extend for connection to the Christmas tree 50. One flange bolt hole 206 is enlarged to receive a correspondingly enlarge bolt or the like to ensure proper orientation of the stab member 200 with the Christmas tree and therefore proper rotational alignment of the stab member 200 when it is inserted into the stab receptacle 120. A stab support ring 230, of larger outer diameter and attached to the exterior of the stab member 200, supports the stab member 200 on the tree module frame 42. To aid in verifying proper location and setting of the stab member 200 within the stab receptacle 120, a stab indicator groove 232 is cut into the stab body 210 below the stab support ring 230. The stab member 200 includes a pair of seal assemblies 240, 260 disposed on the exterior periphery of the stab body 210, above and below the stab body side bore 236.

Figure 7:
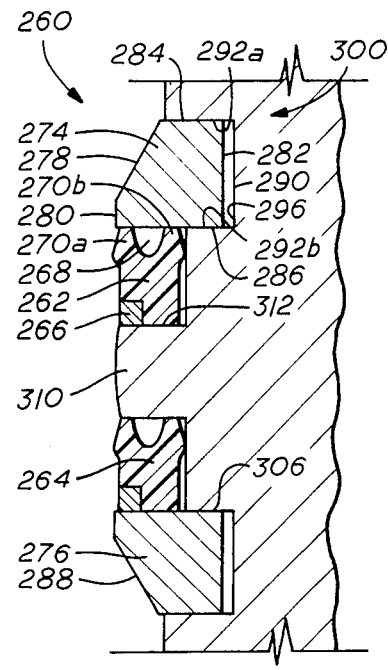
FIG. 7 illustrates a detailed cross-sectional view of a lower seal assembly on the stab member of FIG. 6.

Referring to FIG. 7, the details of the lower seal assembly 260 are shown therein. The lower seal assembly 260 includes a top seal element 262 and a bottom seal element 264, each being a lip-type, elastomeric seal element. Since the details of each seal element 262, 264 are substantially identical, further reference will be made only to the top seal element 262. The description of the top seal element 262 will therefore apply as well to the bottom seal element 264.

The seal element 262 is circular or ring-shaped, and is disposed about the circumference of a seal groove 300 cut into the stab body 210. The base of the seal element 262 contacts a ridge seal surface 312 on a seal separating ridge 310. The seal element 262 has a pair of seal lips 270a, 270b projecting above the main body of the seal element 262 and oriented toward the pressure-containing region to be sealed. The seal lips 270a, 270b are shaped to form a recess 268 therebetween. An anti-extrusion ring 266 is disposed around the lower, outer periphery of the seal element 262; the anti-extrusion ring 266 is embedded in and forms an integral part of the body of the seal element 262 and contacts the seal surface 312 of the seal separating ridge 310. The upper surfaces of the seal lips 270a, 270b contact a ring seal surface 286 of a split, two-piece top retainer ring 274.

Figure 9:
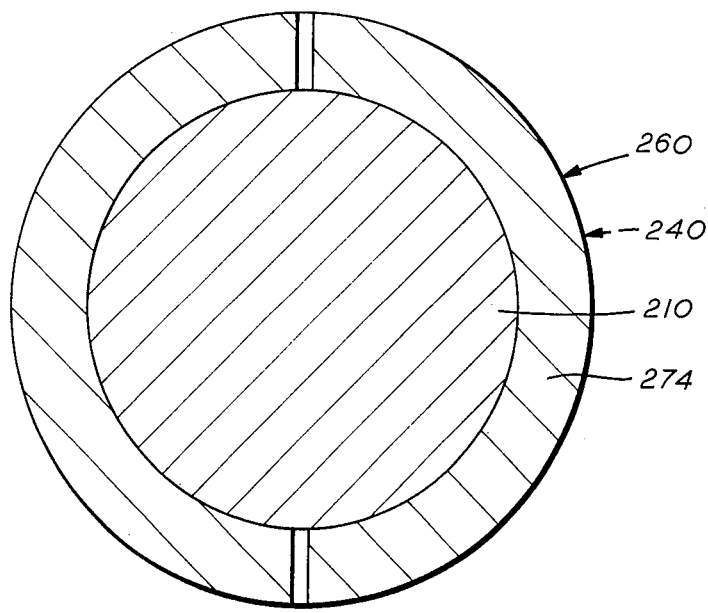
FIG. 9 illustrates a cross-sectional plan view through the stab member of FIG. 6.

As can be seen in FIGS. 7 and 9 (discussed in more detail below), the top retainer ring 274 comprises two semi-circular elements joined to form a single ring encircling the girth of the stab body 210 inside a ring groove 290 cut into the stab body 210. The ring groove 290 has a groove face 296 facing outward from the stab body 210. The retainer ring 274 fits snugly inside the ring groove 290 between upper and lower ring groove ledges 292a, 292b. The retainer ring 274 has an inner diameter surface 282. The inner diameter of the retainer ring 274 is larger than the outer diameter of the ring groove 290 at groove face 296. Hence, when the retainer ring 274 is mounted concentrically with the ring groove 290, a gap exists between the ring groove face 296 and the inner diameter surface 282 of ring 274. The retainer ring 274 also has an outer diameter surface 280 joining an external chamfer surface 278. Chamfer surface 278 joins an upper surface 284 of the retainer ring 274 which contacts the upper ring groove ledge 292a. The chamfer surface 278 forms a frustoconical ring-shaped surface when the two-piece retainer ring 274 is assembled. A bottom retainer ring 276 is constructed in a manner similar to, but reversed top to bottom from, that of the top retainer ring 274. The description of the top retainer ring 274, accordingly, applies generally to the bottom retainer ring 276.

The construction of the upper seal assembly 240 is similar to that of the lower seal assembly 260, with the exception that the upper seal assembly 240 does not include retainer rings such as retainer rings 274, 276 of the lower seal assembly 260. The lower seal assembly 260 makes initial contact as the stab member 200 is inserted into the stab receiving bore 170 of the stab receptacle 120. The retainer rings 274, 276 assist in this stab-in process. The upper seal assembly 240 serves primarily to seal the stab member 200 inside the stab receptacle 120 and plays a lesser part in the stab-in operation. The upper seal elements 246a, 246b otherwise are substantially similar to the lower seal elements 262, 264 in the lower seal assembly 260. The lips of the upper seal elements 246a, 246b, however, are oriented downward. In one embodiment of the invention, the cross-sectional areas of the upper seal assembly 240 and the lower seal assembly 260 which are exposed to fluid pressure from within the flow bores of the stab member 200 and stab receptacle 120 are substantially equal. Hence, the present stab connection is not subjected to any net forces from such fluid pressure which would tend to separate or "blow apart" the connection. In other words, the present stab connection is "pressure balanced" with respect to fluid pressure contained within the connection.

Figure 8:
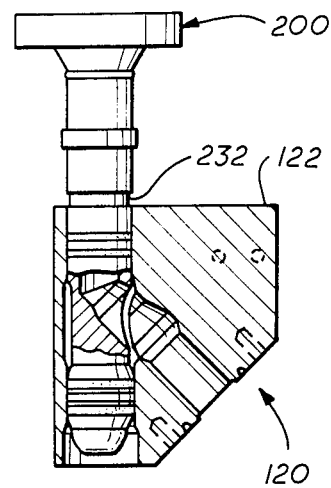
FIG. 8 illustrates a partial cut-away elevational view of the stab member of FIG. 6 received into the stab receptacle of FIG. 3.

Referring now to FIG. 8, there is shown the stab member 200 inserted and seated in the stab receiving bore 170 of the stab receptacle 120. The stab indicator groove 232 is aligned at its lower periphery with the upper face 122 of the stab receptacle 120, thereby showing proper seating of the stab member 200. The stab body side port 236 leading to the stab body bore 212 is landed within the intermediate bore 176 of the stab receiving bore 170. The stab body side port 236, moreover, is aligned properly with the receptacle flow bore 150. The upper seal assembly 240 is sealingly engaged with the upper seal bore 172 of the stab receiving bore 170; likewise, the lower seal assembly 260 is sealingly engaged with the lower sealing bore 174. The pressure-balanced stab connection is thus complete. Produced fluids can flow from the wellhead 18, through the stab member 210 flange bore 208, through the stab body bore 212, through the intermediate bore 176 of the stab receiving bore 170, through the receptacle flow bore 150, out through the receptacle flow bore entry 162, thence into the FCM flowline 82 and the template flowline 24 to a remote location for processing. The flow, of course, can easily be reversed if desired, such as for injecting fluids into the well. The improvements and advantages of this connection built according to the principles of the invention, over the prior art apparatus, are many and varied.

The present invention depicted in FIG. 9, results in a connection having no blow-apart forces due to internal pressures that might tend to separate the connection. The contained internal pressures within the flow bores 150, 212 communicates with the intermediate bore 176 of the stab receiving bore 170. This pressure acts equally on the upper seal assembly 240 and the lower seal assembly 260. As long as the cross-sectional areas of these two seal assemblies 240, 260 exposed to the pressure in the intermediate bore 176 are equal, there will be no internal pressure-induced force urging the stab member 200 out of the stab receiving bore 170. The invention, therefore, eliminates the need for clamping or bolting or holding the connection together in any way to resist blow-apart forces due to internal pressure. The internal pressures are safely contained and controlled, but create no danger of breaking the connection between the Christmas tree 50 and the remainder of the subsea wellhead system 10 at the point of the pressure-balanced stab connection.

As another advantage, the present pressure-balanced stab connection, although possessing high pressure integrity, is not a rigid connection. The connection will contain and control the high subsea well pressures experienced of late in underwater hydrocarbon production operations as long as the seal assemblies 240, 260 are seated and sealing within their respective sealing bores 172, 174. Beyond this requirement, there can be relative movement between the stab receptacle 120 and the stab member 200 while the high pressure seal of seal assemblies 240, 260 is maintained. The relative movement between the member 200 and receptacle 120 can be axial, lateral, or rotational, or any combination of the three, as long as the upper and lower seals on each side of the intermediate bore 176 retain pressure integrity. The invention thus solves the problem of maintaining a high pressure seal before, during, and after relative movement between a wellhead and its Christmas tree attached to a well sunk deep within the earth on one hand, and various production equipment and facilities floating on or in the water or fixed to the sea floor or the surface of the earth, on the other. Relative movement between a wellhead and its flowlines can occur, for example, with no immediate danger of excessive stressing or failure of the pressure balanced stab of the connection of the present invention.

The invention further provides for easier remote installation of a Christmas tree on a subsea wellhead, and connection of that Christmas tree to production facilities. The mounting of each stab receptacle 120 to the FCM frame 72 allows the stab receptacle 120 to pivot and deflect as necessary, within limits, as the wellhead 18 is lowered and the stab member 200 enters the stab receiving bore 170. The bracket studs 94 provide sufficient axial rigidity to support each stab receptacle 120 vertically. The bracket studs 94, being relatively long in proportion to their transverse cross-sectional diameter, allow each stab receptacle 120 to deflect horizontally and rotationally, within limits, to accommodate the landing of an inperfectly aligned stab member 200. The necessary tolerance for aligning the stab member 200 and the stab receptacle 120 is thus reduced, making such connection more practically feasible and economical. The deflectable stab receptacle 120 of the present invention thus simplifies the task of connecting subsea wellheads to production flowlines.

The construction of the lower seal assembly 260 further enhances the ease of installation of the tree module 40. The tree module 40, when lowered from a drilling vessel, is highly unlikely to align perfectly for a stab member 200 to drop concentrically into its stab receiving bore 170. The sliding retainer rings 274, 276 allow making the connection even when the center line of the stab member 200 is not aligned with the center line of the stab receiving bore 170. The gap between the inner diameter surface 282 of the retainer ring 274 and the ring groove face 296, and the like gap between the inner diameter surface of the retainer ring 276 and the corresponding lower ring groove face, allow the retainer rings 274, 276 to deflect laterally while the stab member 200 is lowered into the stab receptacle 120. The external chamfer surfaces 278, 288 cause the retainer rings 274, 276 to deflect laterally as necessary, within tolerance limits, for the stab member 200 to proceed downward into the stab receiving bore 170. At the same time, the retainer rings 274, 276 protect the seal elements 262, 264 from damage during installation of the stab member 200. The stab nose 234 helps initiate insertion of the stab member 200 into the stab entry bore 178 and the remainder of the stab receiving bore 170. When the stab member 200 is finally seated within the stab receptacle 120, a pressure seal can be maintained even though the center lines of the stab member 200 and the stab receiving bore 170 are not precisely aligned. If the stab member 200 is deflected laterally, the ring seal surfaces 286, 306 on the retainer rings 274, 276 help maintain pressure integrity of the connection.

The present invention provides another advantage over prior art connections in that the present invention improves the flow profile of fluids flowing in either direction between the receptacle flow bore 150 and the lower stab bore 216. The configuration of the two bores 150, 216 allows flowing fluid to avoid sharp corners, and to flow against only flat or obtuse-angle surfaces, with a large vertical positional tolerance. The stab member 200 may be landed within the stab receptacle 120 anywhere within a considerable range of positions, as long as the upper seal assembly 240 and the lower seal assembly 260 sealingly engage the upper sealing bore 172 and lower sealing bore 174, respectively. Fluids may flow from the receptacle flow bore 150 to the lower stab bore 216, or vice versa, without impinging on any sharp corners. This flow profile is achieved regardless of the exact vertical positioning of the stab member 200 within the stab receiving bore 170. The configuration of the bores further reduces turbulence in the fluid flowing through the connection. The enlarged portion 224 of the lower stab bore 216 works in conjunction with the expanded portion 160 of the receptacle flow bore 150 to minimize flowing turbulence. These larger portions 160, 224 of the bores, as well as the tapered portions 156, 158, 222, combine to reduce turbulence that might otherwise arise from vertical misalignment of the stab member 200 inside the stab receiving bore 170.

Figure 10:
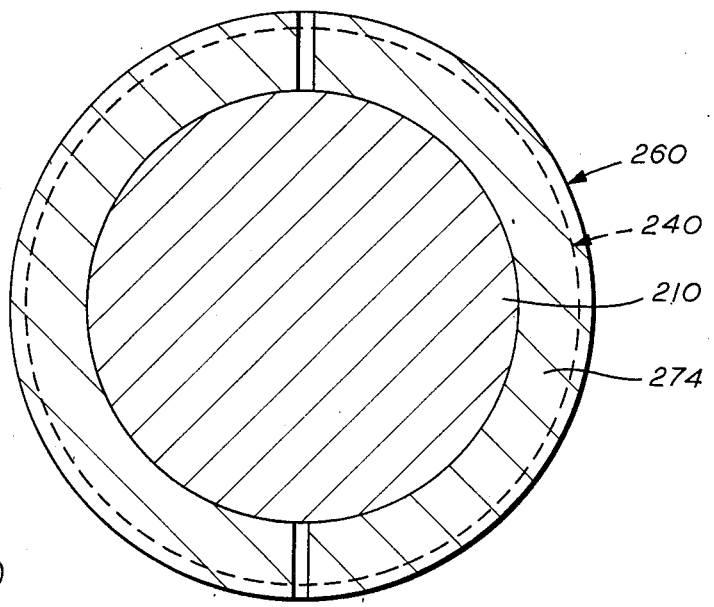
FIG. 10 illustrates a stab member configuration alternative to that depicted in FIG. 9.

A particularly advantageous modification of the above-described apparatus yet remaining within the spirit of the present invention is for the lower seal assembly 260 to have a larger cross-sectional area exposed to pressure within the intermediate bore 176 than the cross-sectional area of the upper seal assembly 240 exposed to the same pressure, as depicted in FIG. 10. This modification results in a net downward force on the stab member 200, tending to hold the connection together with a force proportionate to the magnitude of the pressure within bore 176 and the differential in cross-sectional area exposed to such pressure between the two seal assemblies 240, 260. Thus, for this embodiment of the invention, there is in effect a "reverse" or "anti-" blow-apart force on the stab connection between member 200 and receptacle 120.

While a preferred embodiment of the invention has been shown and described, further modifications thereof can be made by one skilled in the art without departing from the spirit of the invention.

We claim:

1. Apparatus for sealingly connecting a flow bore of a wellhead to a flowline, comprising:

a stab member including a stab body, said stab body having a stab body bore therethrough, one end of said stab body bore exiting from said stab body and being in fluid communication with the flow bore and the other end of said stab body bore exiting from a side of said stab body through a stab body side port;

a stab receptacle mounted on the wellhead and having a stab receiving bore therethrough for receiving said stab body therewithin;

said stab receptacle having a receptacle flow bore therethrough, one end of said receptacle flow bore being in fluid communication with said stab receiving bore and the other end of said receptacle flow bore exiting said stab receptacle and being in fluid communication with the flowline;

means for establishing fluid communication between said stab body side port and said one end of said receptacle flow bore when said stab body is received within said stab receiving bore, including means disposed on said stab member for orienting said stab member with respect to said Christmas tree for ensuring the alignment of said stab body side port with said one end of said receptacle flow bore when said stab body is received within said stab receiving bore; and first and second sealing means disposed on said stab body above and below said stab body side port, respectively, for sealing engagement with the walls of said stab receiving bore above and below said one end of said receptacle flow bore for establishing a non-blow-apart, fluid pressure sealed flow passage between said stab body bore of said stab member and said receptacle flow bore of said stab receptacle when said stab body is landed within said stab receiving bore.

2. Apparatus according to claim 1, wherein said stab body includes a stab flange at its upper end having a plurality of bolt holes disposed about its circumference for receiving bolts therewithin for mounting said stab flange, and said orienting means includes a relatively enlarged bolt hole among said plurality of holes for receiving a correspondingly relatively enlarged bolt therewithin.

3. Apparatus for sealingly connecting a flow bore of a wellhead to a flowline, comprising:

a stab member including a stab body, said stab body having a stab body bore therethrough, one end of said stab body bore exiting from said stab body and being in fluid communication with the flow bore and the other end of said stab body bore exiting from a side of said stab body through a stab body side port;

a stab receptacle mounted on the wellhead and having a stab receiving bore therethrough for receiving said stab body therewithin;

said stab receptacle having a receptacle flow bore therethrough, one end of said receptacle flow bore being in fluid communication with said stab receiving bore and the other end of said receptacle flow bore exiting said stab receptacle and being in fluid communication with the flowline;

means for establishing fluid communication between said stab body side port and said one end of said receptacle flow bore when said stab body is received within said stab receiving bore; and first and second sealing means disposed on said stab body above and below said stab body side port, respectively, for sealing engagement with the walls of said stab receiving bore above and below said one end of said receptacle flow bore for establishing a non-blow-apart, fluid pressure sealed flow passage between said stab body bore of said stab member and said receptacle flow bore of said stab receptacle when said stab body is landed within said stab receiving bore, said first and second sealing means being sized such that fluid pressure acting from within said flow passage on cross-sectional areas of said first and second sealing means exposed to such fluid pressure effects a reverse blow-apart force tending to prevent withdrawal of said stab member from said stab receiving bore.

4. Apparatus according to claim 3, wherein the cross-sectional area of said second sealing means exposed to such fluid pressure acting from within said flow passage is larger than the cross-sectional area of said first sealing means exposed to such fluid pressure.

5. Apparatus for sealingly connecting a flow bore of a wellhead to a flowline, comprising:
   a stab member including a stab body, said stab body having a stab body bore therethrough, one end of said stab body bore exiting from said stab body and being in fluid communication with the flow bore and the other end of said stab body bore exiting from a side of said stab body through a stab body side port;
   a stab receptacle mounted on the wellhead and having a stab receiving bore therethrough for receiving said stab body therewithin;
   said stab receptacle having a receptacle flow bore therethrough, one end of said receptacle flow bore being in fluid communication with said stab receiving bore and the other end of said receptacle flow bore exiting said stab receptacle and being in fluid communication with the flowline;
   means for establishing fluid communication between said stab body side port and said one end of said receptacle flow bore when said stab body is received within said stab receiving bore;
   first and second sealing means disposed on said stab body above and below said stab body side port, respectively, for sealing engagement with the walls of said stab receiving bore above and below said one end of said receptacle flow bore for establishing a non-blow-apart, fluid pressure sealed flow passage between said stab body bore of said stab member and said receptacle flow bore of said stab receptacle when said stab body is landed within said stab receiving bore; and
   means in said stab body bore and said receptacle flow bore for reducing the turbulence of fluid flow through said bores, said turbulence-reducing means including an enlarged-diameter portion of said stab body bore terminating at and extending from said side port, a substantially non-enlarged-diameter portion of said receptacle flow bore terminating at and extending from said one end of said receptacle flow bore and joining an enlarged-diameter portion of said receptacle flow bore that terminates at and joins a substantially non-enlarged diameter portion of said receptacle flow bore, wherein diameter is measured transverse to an axis of flow within said bores.

6. Apparatus according to claim 5, wherein said turbulence-reducing means includes a tapered portion of said stab body bore extending from the end of said enlarged portion opposite from said side port, said tapered portion narrowing in internal diameter to terminate in a substantially non-enlarged-diameter portion of said stab body bore.

7. Apparatus according to claim 6, wherein said enlarged-diameter portion of said receptacle flow bore is a stepped portion having a long tapered portion intersecting said one end of said receptacle flow bore and increasing in internal diameter as it extends therefrom, an expanded-diameter portion communicating with the end of said long tapered portion opposite from said one end of said receptacle flow bore and extending away from said long tapered portion, and a short tapered portion extending from the end of said expanded-diameter portion opposite from said long tapered portion and narrowing in internal diameter as it extends away from said expanded-diameter portion.

8. Apparatus for sealingly connecting a flow bore of a wellhead to a flowline, comprising:
   a stab member including a stab body, said stab body having a stab body bore therethrough, one end of said stab body bore exiting from said stab body and being in fluid communication with the flow bore and the other end of said stab body bore exiting from a side of said stab body through a stab body side port;
   a stab receptacle mounted on the wellhead and having a stab receiving bore therethrough for receiving said stab body therewithin;
   said stab receptacle having a receptacle flow bore therethrough, one end of said receptacle flow bore being in fluid communication with said stab receiving bore and the other end of said receptacle flow bore exiting said stab receptacle and being in fluid communication with the flowline;
   means for establishing fluid communication between said stab body side port and said one end of said receptacle flow bore when said stab body is received within said stab receiving bore;
   first and second sealing means disposed on said stab body above and below said stab body side port, respectively, for sealing engagement with the walls of said stab receiving bore above and below said one end of said receptacle flow bore for establishing a non-blow-apart, fluid pressure sealed flow passage between said stab body bore of said stab member and said receptacle flow bore of said stab receptacle when said stab body is landed within said stab receiving bore; and
   upper and lower retainer ring means disposed around said stab body above and below said second sealing means, respectively, for facilitating stab-in of said stab body into said stab receiving bore in the event said stab body is misaligned with said stab receiving bore.

9. Apparatus according to claim 8, wherein said upper and lower retainer ring means include a retainer ring having an external chamfer surface.

10. The apparatus according to claim 9, wherein said retainer ring is a split ring adapted to protect one of said sealing means.

11. Apparatus according to claim 9, wherein said retainer ring is disposed in a ring groove around said stab body, said ring groove having upper and lower ring groove ledges and an axially extending groove face therebetween, and the inside diameter of said retainer ring is greater than the outside diameter of said groove face.

12. Apparatus according to claim 11, wherein said second sealing means includes upper and lower elastomeric seal ring elements, and said stab body includes a circumferential seal ridge portion separating said seal ring elements, said seal ridge portion having an outside diameter greater than the outside diameter of said stab body adjacent said seal ridge portion.

13. Apparatus according to claim 12, wherein each of said upper and lower retainer ring means includes one of said retainer rings, said retainer ring of said lower retainer ring means having an upwardly facing ring seal surface on which the bottom face of said lower seal ring element is disposed, and said retainer ring of said upper retainer ring means having a downwardly facing ring seal surface in engagement with a top face of said upper seal ring element, and said seal ridge portion having an upwardly facing ridge seal surface on which a bottom face of said upper seal ring element is disposed and a downwardly facing ridge seal surface in engagement with a top face of said lower seal ring element.

14. Apparatus according to claim 13, wherein said chamfer surface of said lower retainer ring of said lower retainer ring means includes a downwardly and outwardly facing, downwardly narrowing tapered surface and said chamfer surface of said retainer ring of said upper retainer ring means includes an upwardly and outwardly facing, upwardly narrowing tapered surface.

15. Apparatus according to claim 14, wherein said seal ring elements are lip seals.

16. Apparatus for sealingly connecting a flow bore of a wellhead to a flowline, comprising:
a stab member including a stab body, said stab body having a stab body bore therethrough, one end of said stab body bore exiting from said stab body and being in fluid communication with the flow bore and the other end of said stab body bore exiting from a side of said stab body through a stab body side port;
a stab receptacle mounted on the wellhead and having a stab receiving bore therethrough for receiving said stab body therewithin;
said stab receptacle having a receptacle flow bore therethrough, one end of said receptacle flow bore being in fluid communication with said stab receiving bore and the other end of said receptacle flow bore exiting said stab receptacle and being in fluid communication with the flowline;
means for establishing fluid communication between said stab body side port and said one end of said receptacle flow bore when said stab body is received within said stab receiving bore;
first and second sealing means disposed on said stab body above and below said stab body side port, respectively, for sealing engagement with the walls of said stab receiving bore above and below said one end of said receptacle flow bore for establishing a non-blow-apart, fluid pressure sealed flow passage between said stab body bore of said stab member and said receptacle flow bore of said stab receptacle when said stab body is landed within said stab receiving bore; and
stab receptacle mounting means for mounting said stab receptacle on the wellhead for rigidly resisting forces acting on said stab receptacle in a vertical direction and for permitting lateral and rotational deflection of said stab receptacle with respect to the wellhead when forces act on said stab receptacle from other than a vertical direction.

17. Apparatus according to claim 16, wherein said mounting means including a plurality of mounting brackets attached to said stab receptacle near its upper end, and including a mounting stud for each said bracket attached at its upper end to said bracket and at its lower end to the wellhead, said studs being relatively long in relation to their transverse thickness.

18. Apparatus according to claim 17, including mounting plate means mounted on said stab receptacle and cooperable with retainer plate means mounted on the wellhead for limiting the lateral and rotational deflection of said stab receptacle with respect to the wellhead.

19. A pressure-balanced stab assembly for connecting flow-conducting conduits, comprising:
a stab member having a first flow bore therethrough;
a receptacle member having a receiving bore therethrough for receiving said stab member therewithin, and a second flow bore intersecting said receiving bore and communicating with the exterior of said receptacle member;
said first flow bore communicating with said second flow bore at a communication region within said receiving bore when said stab member is landed within said receiving bore;
upper and lower sealing means disposed on said stab member for sealing engagement with the walls of said receiving bore above and below said communication region when said stab member is landed within said receiving bore, said upper and lower sealing means having substantially equal cross-sectional areas exposed to pressure from fluids within said communication region; and
means disposed on said stab member above and below said lower sealing means for protecting said sealing means during stab-in of said stab member into said receiving bore and for facilitating such stab-in in the event said stab member is misaligned with said receiving bore.

20. A stab assembly according to claim 19, and including means in said first and second flow bores for reducing the turbulence of fluid flow through said bores.

21. A stab assembly according to claim 19, wherein said lower sealing means protecting means and stab-in facilitating means includes upper and lower split retainer rings disposed around said stab member above and below said lower sealing means, respectively, said split retainer rings each having an external chamfer surface.

22. A stab assembly according to claim 21, wherein each retainer ring is disposed in a groove around the periphery of said stab member, and there is a gap between the inner diameter surface of said retainer rings and the opposing groove face of said grooves.

23. A stab assembly according to claim 22, wherein said lower retainer ring chamfer surface is a downwardly and outwardly facing, downwardly narrowing frustoconical surface and said upper retainer ring chamfer surface is an upwardly and outwardly facing, upwardly narrowing frustoconical surface.

24. A stab assembly according to claim 23, wherein said lower sealing means includes a plurality of elastomeric seal ring elements separated by a raised, circumferentially extending ridge surface portion of said stab member.

25. A stab assembly according to claim 24, wherein said upper sealing means includes a plurality of elastomeric seal ring elements, and said seal ring elements are lip seals having their lips facing toward said communication region.

* * * * *